No. 814,923. PATENTED MAR. 13, 1906.
O. STÄDTLER.
STETHOSCOPE.
APPLICATION FILED JULY 24, 1905.
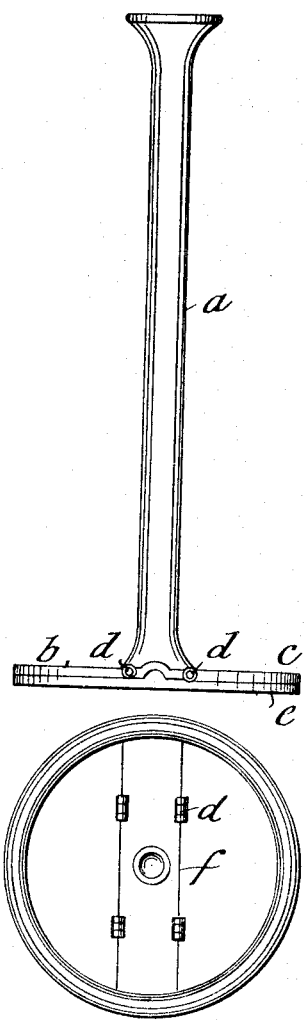
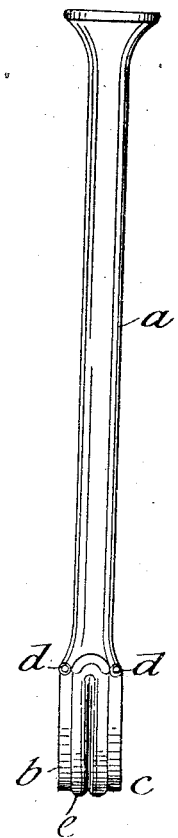

UNITED STATES PATENT OFFICE.

OTTO STÄDTLER, OF GEHRDEN, GERMANY.

STETHOSCOPE.

No. 814,923.   Specification of Letters Patent.   Patented March 13, 1906.

Application filed July 24, 1905. Serial No. 271,106.

*To all whom it may concern:*

Be it known that I, OTTO STÄDTLER, a subject of the German Emperor, residing at Gehrden, in the Province of Hanover and Kingdom of Prussia, Germany, have invented a new and useful Improvement in Stethoscopes, of which the following is a specification.

My invention relates to improvements in stethoscopes with folding disk; and the objects of my improvements are, first, to enable the instrument to be brought into small compass and convenient form, so as to be carried in the pocket or placed in a flat case; second, to protect its hollow stem from the entrance of foreign bodies when the disk is in a folded condition, and, third, to prevent accidental loss of the disk, which might occur when the latter was removed from the tube in order to reduce the space required in carrying it. I attain these objects in the manner indicated in the accompanying drawings, in which—

Figure 1 shows a side view of the stethoscope ready for use; Fig. 2, the disk seen from below; Fig. 3, a side view of the stethoscope with disk folded together for transport.

Similar letters refer to similar parts throughout the several views.

The hollow stem $a$, of suitable material, as wood, hard rubber, metal, or ivory, bears at its lower end a disk composed of three parts, of which the two side ones $b$ and $c$ are hinged to the third or central one, which latter is fixed on the end of the hollow stem and may be in one piece therewith. The portions $b$ and $c$ are attached by sunken hinges $d$ in such manner that they cannot be folded back toward the stem $a$, but can, however, be folded together below this latter. As when the instrument is being used it must press closely to the body of the subject being examined in order to exclude other sounds than those which it is desired to hear, the disk is provided on its under surface with a packing-ring of soft rubber or similar material $e$, which has the further effect of preventing slipping when in use. When the disk is folded together, the rubber packing-ring $e$ forms a closed joint to protect the bore $f$ from the entrance of foreign substances. This is of great advantage, as should a piece of wadding or other small object get into the bore, it would influence the result of the examination.

What I claim as my invention, and desire to secure to me by Letters Patent of the United States of America, is—

1. In a stethoscope the combination of a stem and disk comprising a plurality of hinged parts one of which is integral with the stem.

2. In a stethoscope the combination of a stem and a tripartite disk comprising a central portion integral with the stem and two side portions hinged to said central portion.

3. In a stethoscope the combination of a stem and a tripartite disk comprising a central portion integral with the stem and two side portions and hinges connecting the side and central portions and permitting limited folding movement to the side portions.

4. In a stethoscope the combination of a stem and a tripartite disk comprising a central portion integral with the stem and two side portions and hinges connecting the side and central portions and permitting limited folding movement to the side portions together with a flexible packing-ring attached to the face of said disk substantially as and for the purpose set forth.

In testimony whereof I have signed my name to this specification in the presence of two subscribing witnesses.

OTTO STÄDTLER.

Witnesses:
 GEORG KING,
 CARL SCHWIEGER.